US012367683B2

United States Patent
Ansari et al.

(10) Patent No.: US 12,367,683 B2
(45) Date of Patent: Jul. 22, 2025

(54) EFFICIENT CONSTRUCTION AND CONSUMPTION OF AUXILIARY CHANNELS IN CONVOLUTIONAL NEURAL NETWORKS

(71) Applicant: QUALCOMM Incorporated, San Diego, CA (US)

(72) Inventors: Amin Ansari, Kirkland, WA (US); Sai Madhuraj Jadhav, San Diego, CA (US); Yunxiao Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 18/463,040

(22) Filed: Sep. 7, 2023

(65) Prior Publication Data

US 2024/0371169 A1   Nov. 7, 2024

Related U.S. Application Data

(60) Provisional application No. 63/500,414, filed on May 5, 2023.

(51) Int. Cl.
*G06V 20/56* (2022.01)
*G05D 1/00* (2006.01)
(Continued)

(52) U.S. Cl.
CPC ............. *G06V 20/56* (2022.01); *G05D 1/021* (2013.01); *G06T 7/70* (2017.01); *G06T 7/90* (2017.01);
(Continued)

(58) Field of Classification Search
CPC .......... G06V 20/56; G06V 10/82; G06T 7/90; G06T 7/70; G06T 2207/10024; G06T 2207/30252; G05D 1/021
(Continued)

(56) References Cited

U.S. PATENT DOCUMENTS

2018/0315154 A1   11/2018   Park et al.
2020/0250468 A1   8/2020    Kim et al.
(Continued)

FOREIGN PATENT DOCUMENTS

CN      111191735 A    5/2020
EP        4009269 A1   6/2022

OTHER PUBLICATIONS

Almalioglu Y., et al., "SelfVIO: Self-Supervised Deep Monocular Visual-Inertial Odometry and Depth Estimation", Arxiv.Org, Cornell University Library, 201 Olin Library Cornell University Ithaca, NY 14853, arXiv:1911.09968v1 [cs.CV], Nov. 22, 2019, XP081537701, pp. 1-15, III. Self-Supervised Monocular VIO and Depth Estimation Architecture, figure 2.

(Continued)

*Primary Examiner* — Allen C Wong
(74) *Attorney, Agent, or Firm* — Shumaker & Sieffert, P.A.

(57) ABSTRACT

An example device for processing image data includes a memory configured to store image data; and a processing system comprising one or more processors implemented in circuitry, the processing system being configured to: obtain an image to be processed; obtain a first auxiliary value for the image and a second auxiliary value for the image; generate an input component including the first auxiliary value and the second auxiliary value arranged in a pattern according to a stride of a neural network; and provide the image and the input component to the neural network.

33 Claims, 11 Drawing Sheets

(51) Int. Cl.
    *G06T 7/70*          (2017.01)
    *G06T 7/90*          (2017.01)
    *G06V 10/82*        (2022.01)

(52) U.S. Cl.
    CPC .... *G06V 10/82* (2022.01); *G06T 2207/10024* (2013.01); *G06T 2207/30252* (2013.01)

(58) Field of Classification Search
    USPC ......................................................... 348/148
    See application file for complete search history.

(56) References Cited

U.S. PATENT DOCUMENTS

2020/0409385 A1* 12/2020 Chakravarty ........ G05D 1/0253
2021/0312234 A1* 10/2021 Jang ..................... G06F 16/583
2021/0406560 A1   12/2021 Park et al.

OTHER PUBLICATIONS

Aslan M.F., et al., "Visual-Inertial Image-Odometry Network (VIIONet): a Gaussian Process Regression-Based Deep Architecture Proposal for UAV Pose Estimation", Measurement, Institute of Measurement and Control. London, GB, vol. 194, Mar. 21, 2022, XP087046756, Abstract, pp. 1-15, 3. Differences and contributions of this study, 4. Datasets for experimental studies, 5. Proposed methodology, figure 3.

International Search Report and Written Opinion—PCT/US2024/025975—ISA/EPO—Jul. 25, 2024.

Szegedy C., et al., "Rethinking the Inception Architecture for Computer Vision", 2016 IEEE Conference on Computer Vision and Pattern Recognition (CVPR), IEEE, Jun. 27, 2016, XP033021462, pp. 2818-2826, 5. Efficient Grid Size Reduction, 6. Inception-v3.

\* cited by examiner

EFFICIENT CONSTRUCTION AND CONSUMPTION OF AUXILIARY CHANNELS IN CONVOLUTIONAL NEURAL NETWORKS

This application claims the benefit of U.S. Provisional Application No. 63/500,414, filed May 5, 2023, the entire contents of which are hereby incorporated by reference.

TECHNICAL FIELD

This disclosure relates to artificial intelligence, particularly as applied to autonomous driving systems.

BACKGROUND

Techniques are being researched and developed related to autonomous driving and advanced driving assistance systems. For example, artificial intelligence and machine learning (AI/ML) systems are being developed and trained to determine how best to operate a vehicle according to applicable traffic laws, safety guidelines, external objects, roads, and the like. Using cameras to collect images, depth estimation is performed to determine depths of objects in the images. Depth estimation can be performed by leveraging various principles, such as calibrated stereo imaging systems and multi-view imaging systems.

Various techniques have been used to perform depth estimation. For example, test-time refinement techniques include applying an entire training pipeline to test frames to update network parameters, which necessitates costly multiple forward and backward passes. Temporal convolutional neural networks rely on stacking of input frames in the channel dimension and bank on the ability of convolutional neural networks to effectively process input channels. Recurrent neural networks may process multiple frames during training, which is computationally demanding due to the need to extract features from multiple frames in a sequence and does not reason about geometry during inference. Techniques using an end-to-end cost volume to aggregate information during training are more efficient than test-time refinement and recurrent approaches, but are still non-trivial and difficult to map to hardware implementations.

SUMMARY

In general, this disclosure describes techniques for processing image data to determine positions of objects in the image data relative to a position of a vehicle including a camera that captured the image data. An autonomous driving unit of the vehicle may use the positions of the objects when determining an appropriate action to take, such as accelerating, turning, braking, or the like. Determining positions may include performing depth estimation, which may be performed using a single camera according to the techniques of this disclosure. Auxiliary information, such as odometry information, for the vehicle may be provided, along with image data, to an artificial intelligence/machine learning (AI/ML) unit, such as a neural network, which may be trained to calculate positions (e.g., depths) of objects in the image data relative to the position of the vehicle when the image data was captured. To provide the auxiliary information, two or more sets of auxiliary information may be combined into a single input component. For example, a single input component may include values for each of an X-position, a Y-position, a Z-position, and a yaw of the vehicle when the image was calculated. Rather than providing each of these values in distinct components, the values may be combined into a single input component, which may reduce memory consumption, reduce processing operations, and/or reduce power consumption associated with providing the auxiliary information to the AI/ML unit.

In one example, a method of processing image data includes obtaining an image to be processed; obtaining a first auxiliary value for the image and a second auxiliary value for the image; generating an input component including the first auxiliary value and the second auxiliary value arranged in a pattern according to a stride of a neural network; and providing the image and the input component to the neural network.

In another example, a device for processing image data includes: a memory configured to store image data; and a processing system comprising one or more processors implemented in circuitry, the processing system being configured to: obtain an image to be processed; obtain a first auxiliary value for the image and a second auxiliary value for the image; generate an input component including the first auxiliary value and the second auxiliary value arranged in a pattern according to a stride of a neural network; and provide the image and the input component to the neural network.

In another example, a computer-readable storage medium has stored thereon instructions that, when executed, cause a processor to obtain an image to be processed; obtain a first auxiliary value for the image and a second auxiliary value for the image; generate an input component including the first auxiliary value and the second auxiliary value arranged in a pattern according to a stride of a neural network; and provide the image and the input component to the neural network.

In another example, a device for processing image data includes means for obtaining an image to be processed; means for obtaining a first auxiliary value for the image and a second auxiliary value for the image; means for generating an input component including the first auxiliary value and the second auxiliary value arranged in a pattern according to a stride of a neural network; and means for providing the image and the input component to the neural network.

The details of one or more examples are set forth in the accompanying drawings and the description below. Other features, objects, and advantages will be apparent from the description, drawings, and claims.

BRIEF DESCRIPTION OF DRAWINGS

FIGS. 6A and 6B are conceptual diagrams illustrating sets of data from various components that are processed together during a common processing task.

DETAILED DESCRIPTION

Depth estimation is an important component of autonomous driving (AD), autonomous driving assistance systems (ADAS), or other systems used to partially or fully autonomously control a vehicle. Depth estimation for such techniques may be used for autonomous driving, assistive robotics, augmented reality/virtual reality scene composition, image editing, or other such techniques. Other types of image processing can also be used for AD/ADAS or other such systems, such as semantic segmentation, object detection, or the like.

Image processing and depth estimation may be performed using machine learning on monocular video data including a series of images. For example, depth may be estimated using structure from motion (SFM) techniques, which generally include estimating the three-dimensional (3D) structure of a scene from a set of two-dimensional images. Monocular video data refers to video data captured by a single camera. Depth estimation using video data captured by a single camera, as opposed to multiple (two or more) cameras, allows for a reduction in cost by only requiring the single camera, as well as an improvement in simplicity, since no coordination or synchronization between multiple cameras is needed. That is, stereo or multi-view camera systems must be calibrated if performing depth estimation using video data captured by such multiple camera systems, which is cumbersome and prone to errors. By contrast, monocular sequences are relatively easy to capture and sanitize.

The depth estimation techniques of this disclosure may be self-supervised. That is, a depth estimation AI/ML unit, such as a neural network, may be trained on monocular video data in order to detect depths of objects in future monocular video data. Additional sensors, such as LiDAR, are not needed for such training, because LiDAR and other range-finding sensors may be sparse and noisy. Acquiring real-world dense ground-truth depth at scale is also difficult. Instead, the techniques of this disclosure may leverage SFM principles to perform view synthesis as the self-supervision level. Thus, these techniques eliminate the need for ground-truth depth. An abundance of monocular data allows for training such AI/ML units and models.

Figure 1:
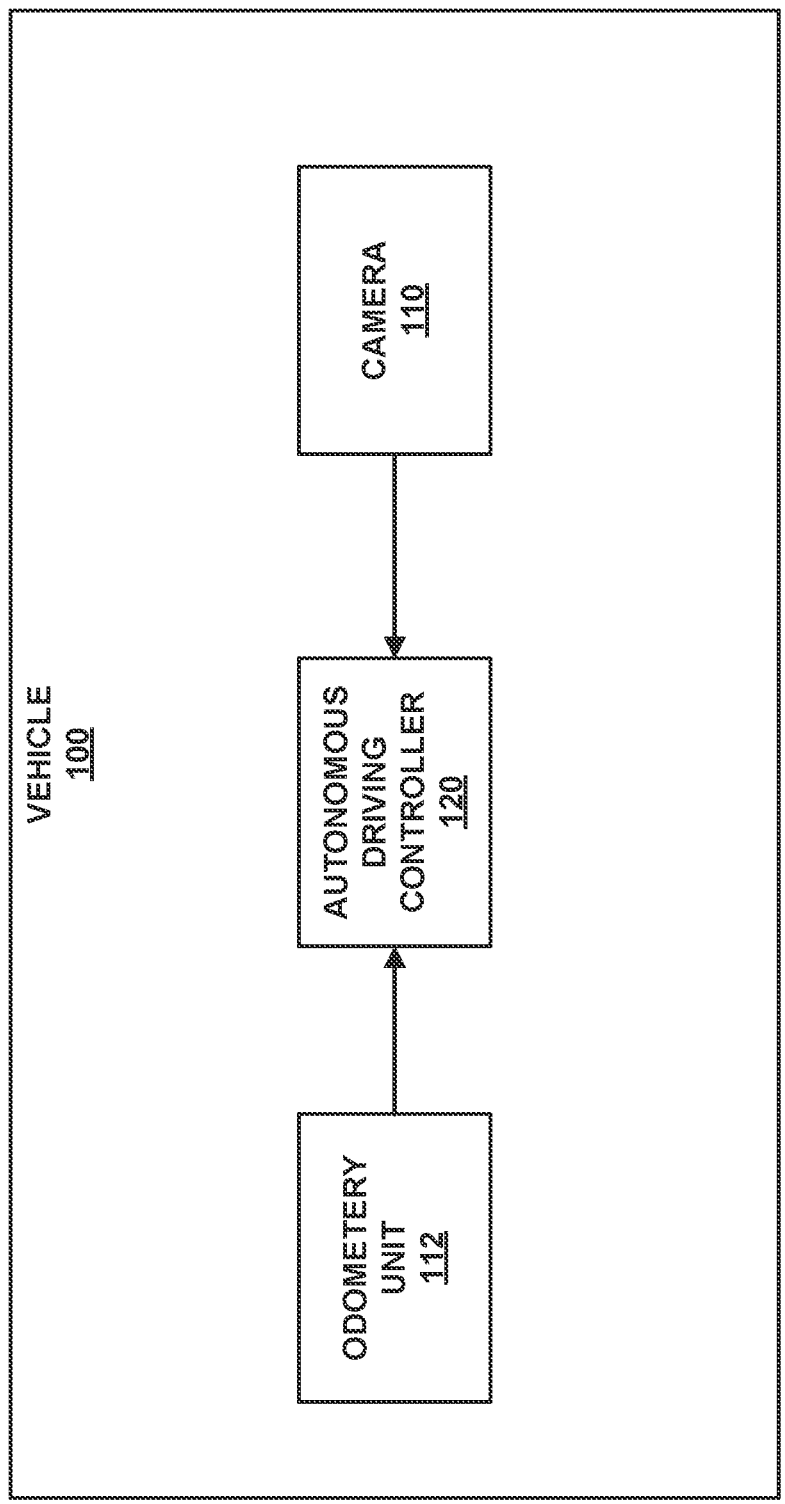
FIG. 1 is a block diagram illustrating an example vehicle including an autonomous driving controller according to techniques of this disclosure.

FIG. 1 is a block diagram illustrating an example vehicle 100 including an autonomous driving controller 120 according to techniques of this disclosure. In this example, vehicle 100 includes camera 110, odometry unit 112, and autonomous driving controller 120. Camera 110 is a single camera in this example. While only a single camera is shown in the example of FIG. 1, in other examples, multiple cameras may be used. However, the techniques of this disclosure allow for depth to be calculated for objects in images captured by camera 110 without additional cameras. In some examples, multiple cameras may be employed that face different directions, e.g., front, back, and to each side of vehicle 100. Autonomous driving controller 120 may be configured to calculate depth for objects captured by each of such cameras.

Odometry unit 112 provides odometry data for vehicle 100 to autonomous driving controller 120. While in some cases, odometry unit 112 may correspond to a standard vehicular odometer that measures mileage traveled, in some examples, odometry unit 112 may, additionally or alternatively, correspond to a global positioning system (GPS) unit or a global navigation satellite system (GNSS) unit. In some examples, odometry unit 112 may be a fixed component of vehicle 100. In some examples, odometry unit 112 may represent an interface to a smartphone or other external device that can provide location information representing odometry data to autonomous driving controller 120.

According to the techniques of this disclosure, autonomous driving controller 120 receives frames captured by camera 110 at a high frame rate, such as 30 fps, 60 fps, 90 fps, 120 fps, or even higher. Autonomous driving controller 120 receives odometry data from odometry unit 112 for each image frame. Per the techniques of this disclosure, autonomous driving controller 120 may associate the odometry data with the image data. In particular, autonomous driving controller 120 may construct an auxiliary input component from two or more values of auxiliary data, such as odometry data. For example, autonomous driving controller 120 may include a depth network or other neural network configured to process image data and associated auxiliary data (e.g., odometry data).

In general, the differences between the odometry data may represent either or both of translational differences and/or rotational differences along various axis in three-dimensional space. Thus, for example, assuming that the X-axis is side-to-side of vehicle 100, the Y-axis is up and down of vehicle 100, and the Z-axis is front to back of vehicle 100, translational differences along the X-axis may represent side to side movement of vehicle 100, translational differences along the Y-axis may represent upward or downward movement of vehicle 100, and translational differences along the Z-axis may represent forward or backward movement of vehicle 100. Under the same assumptions, rotational differences about the X-axis may represent pitch changes of vehicle 100, rotational differences about the Y-axis may represent yaw changes of vehicle 100, and rotational differences about the Z-axis may represent roll changes of vehicle 100. When vehicle 100 is an automobile or other ground-based vehicle, translational differences along the Z-axis may provide the most amount of information, with rotational differences about the Y-axis may provide additional useful information (e.g., in response to turning left or right, or remaining straight).

In order to provide the auxiliary data (e.g., odometry data) to the neural network, autonomous driving controller 120 may structure the auxiliary data in a manner similar to image data. Generally, image data may be partitioned into components, e.g., a red channel component, a green channel component, and a blue channel component, or a luminance component, a blue hue chrominance component, and a red hue chrominance component. Thus, autonomous driving controller 120 may structure the auxiliary input component similar to one of the other image components. In accordance with the techniques of this disclosure, autonomous driving controller 120 may form the auxiliary input component to include multiple auxiliary input values, e.g., according to a convolution and stride of the neural network.

Conventionally, feeding auxiliary information to a CNN is not efficient. One popular method is to replicate each input value in its own channel. These channels may then be concatenated to the input of the CNNs. For example, for a CNN that processes red, green, and blue camera frames, each input frame will have three channels: red, green, and blue. Conventionally, to add camera intrinsic data, such as principal point coordinates, horizontal focal length, vertical focal length, or the like, multiple additional channels would need to be added, e.g., one for each auxiliary input value. Similarly, adding odometry information would require one channel per value. Thus, to add X-, Y-, Z- and yaw values, four additional channels would need to be added, using conventional techniques. This overhead affects the underlying system in multiple ways. For example, this data would need to be stored and computed, which consumes extra power, and may lead to a loss of accuracy (e.g., optimization may have a harder time dealing with the large number of inputs).

Per an example the techniques of this disclosure, the auxiliary input data may include position data for vehicle 100 and yaw rotation for vehicle 100 when an image was captured. Rather than form an X-component, a Y-component, a Z-component, and a yaw component from the position and yaw values, autonomous driving controller 120 may form a single auxiliary input component including data for each of the X-, Y-, and Z-position values and a yaw value. Autonomous driving controller 120 may structure the auxiliary input component such that each of these values can be processed for each stride of the auxiliary input component. As shown in greater detail below, a 3×3 convolution neural network may process a 3×3 set of values of a particular component for each processing step, and "stride" by a factor, e.g., 2, such that a subsequent 3×3 set overlaps with the previous 3×3 set by one value. Thus, autonomous driving controller 120 may form the auxiliary input component to include a repeating block of four values (X-value, Y-value, Z-value, and yaw value). For example, odd-numbered rows of the auxiliary input component may include alternating X-values and Y-values and even-numbered rows of the auxiliary input component may include alternating Z-values and yaw values. In this manner, when the convolutional neural network is a 3×3 CNN and has a stride of 2, the auxiliary input data can be reduced by a factor of 4, compared to providing each input value as a distinct component (or channel).

In this manner, neural networks or other AI/ML units trained to detect depth from an image and auxiliary data (such as odometry data) may be configured to accept an additional component of data structured to include multiple distinct values. The neural networks or other AI/ML units may be trained using such auxiliary input components, then deployed in vehicles to determine depths of objects represented in captured image frames. Autonomous driving controller 120 may use the depths of the objects represented in the image frames when determining how best to control vehicle 100, e.g., whether to maintain or adjust speed (e.g., to brake or accelerate), and/or whether to turn left or right or to maintain current heading of vehicle 100.

Additionally or alternatively, these techniques may be employed in advanced driving assistance systems (ADAS). Rather than autonomously controlling vehicle 100, such ADASs may provide feedback to a human operator of vehicle 100, such as a warning to brake or turn if an object is too close. Additionally or alternatively, the techniques of this disclosure may be used to partially control vehicle 100, e.g., to maintain speed of vehicle 100 when no objects within a threshold distance are detected ahead of vehicle 100, or if a separate vehicle is detected ahead of vehicle 100, to match the speed of the separate vehicle if the separate vehicle is within the threshold distance, to prevent reducing the distance between vehicle 100 and the separate vehicle.

Furthermore, in addition to or in the alternative to the odometry data described above, the auxiliary input data may include other types of input data, such as a LiDAR or other range finding sensors, camera intrinsic values (e.g., horizontal and/or vertical focal length), camera orientation (e.g., front, side, side-front, side-rear, or rear), or other such information.

As such, according to the techniques of this disclosure, autonomous driving controller 120 may reshape auxiliary channel information in a certain way to take advantage of an existing stride of a CNN. Given a relatively large number of available auxiliary channels, autonomous driving controller 120 may reduce the overhead by the stride factor, e.g., to the power of 2. Thus, if the first layer has a stride of 3, the overhead may be reduced by a factor of 9 (3^2).

Figure 2:
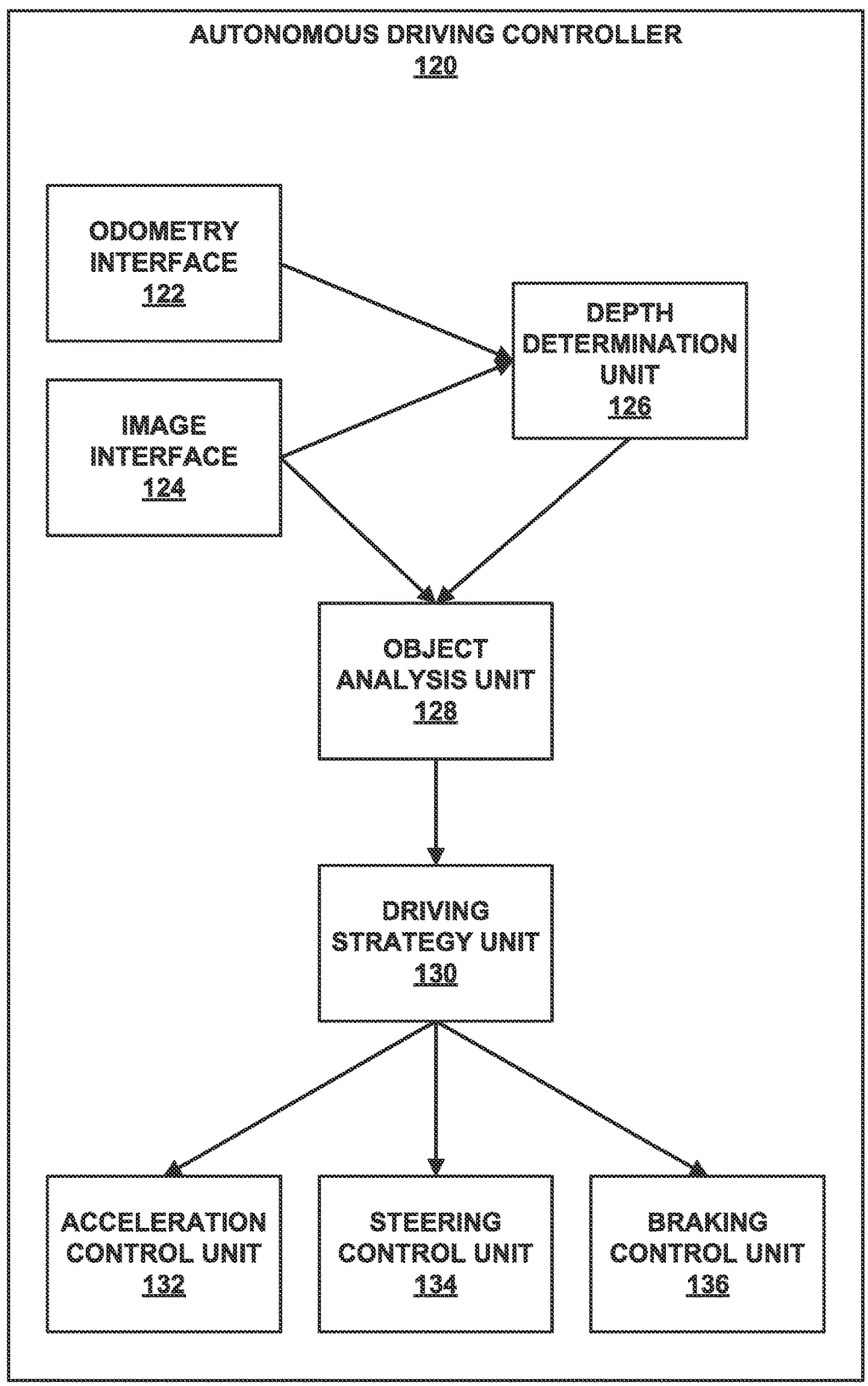
FIG. 2 is a block diagram illustrating an example set of components of an autonomous driving controller according to techniques of this disclosure.

FIG. 2 is a block diagram illustrating an example set of components of autonomous driving controller 120 of FIG. 1 according to techniques of this disclosure. In this example, autonomous driving controller 120 includes odometry interface 122, image interface 124, depth determination unit 126, object analysis unit 128, driving strategy unit 130, acceleration control unit 132, steering control unit 134, and braking control unit 136.

In general, odometry interface 122 represents an interface to odometry unit 112 of FIG. 1, which receives odometry data from odometry unit 112 and provides the odometry data to depth determination unit 126. In particular, as described in greater detail below with respect to FIG. 3, odometry interface 122 may structure the odometry data (and/or other auxiliary input data) in the form of an auxiliary input component including multiple auxiliary values, e.g., each of an X-, Y-, and Z-position value and a yaw value. Image interface 124 represents an interface to camera 110 of FIG. 1 and provides images to depth determination unit 126.

Depth determination unit 126, as explained in greater detail below with respect to FIG. 7, may perform techniques of this disclosure to determine depth of objects represented in images received via image interface 124 using both the images themselves and odometry data received via odometry interface 122. For example, depth determination unit 126 may receive one or more images from camera 110 via image interface 124, as well as odometry data for vehicle 100 at times when the images were captured. In particular, the odometry data may represent differences between odometry values for sequential images. The auxiliary input component may be the same size as components of the image frames (e.g., including a number of samples that is the same as the number of samples in the components of the image frames). Depth determination unit 126 may provide both the components of the image frame and the auxiliary input component to a depth determination network thereof to cause the depth determination network to calculate depths of objects depicted in the image.

Image interface 124 may also provide the image frames to object analysis unit 128. Likewise, depth determination unit 126 may provide depth values for objects in the images to object analysis unit 128. Object analysis unit 128 may generally determine where objects are relative to the position of vehicle 100 at a given time, and may also determine whether the objects are stationary or moving. Object analysis unit 128 may provide object data to driving strategy unit 130, which may determine a driving strategy based on the object data. For example, driving strategy unit 130 may determine whether to accelerate, brake, and/or turn vehicle 100. Driving strategy unit 130 may execute the determined strategy by delivering vehicle control signals to various driving systems (acceleration, braking, and/or steering) via acceleration control unit 132, steering control unit 134, and braking control unit 136.

The various components of autonomous driving controller 120 may be implemented as any of a variety of suitable circuitry components, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Figure 3:
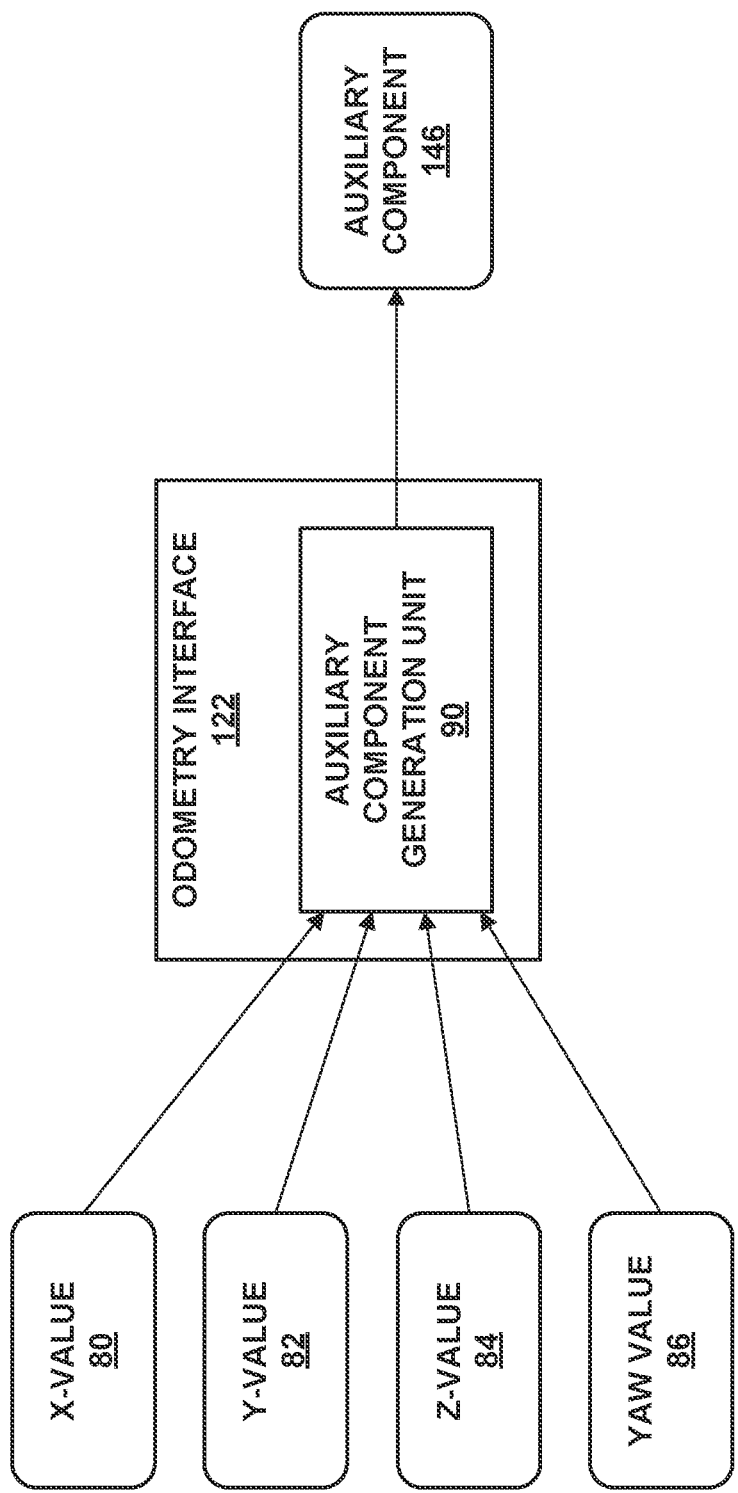
FIG. 3 is a block diagram illustrating an example auxiliary component generation unit of an odometry interface according to techniques of this disclosure.

FIG. 3 is a block diagram illustrating an example auxiliary component generation unit of an odometry interface according to techniques of this disclosure. In this example, odometry interface 122 further includes auxiliary component generation unit 90. Auxiliary component generation unit 90 may receive position values and rotation values (e.g., pitch, yaw, and/or roll values) from odometry unit 112 of FIG. 1. In the example of FIG. 3, auxiliary component generation unit 90 receives X-value 80, Y-value 82, Z-value 84, and yaw value 86. Auxiliary component generation unit 90 may then form auxiliary component 146, including each of X-value 80, Y-value 82, Z-value 84, and yaw value 86 arranged in a block pattern, e.g., with X-value 80 at an upper-left position, Y-value 82 at an upper-right position, Z-value 84 at a lower-left position, and yaw value 86 at a lower-right position.

FIGS. 4A-4D are conceptual diagrams illustrating an example of strided convolution. In general, strided convolution includes, initially, resolution reduction, which is implemented in many convolutional neural networks (CNNs). Resolution reduction may generally be performed to reduce computation operations, allow downstream layers of the neural network to focus on higher level patterns, and to improve overall optimization efficiency. Resolution reduction may be performed directly at the input or may be applied to features identified in an image. Strided convolution may be used to perform resolution reduction, as shown in FIGS. 4A-4D. An alternative to strided convolution is maximum or average pooling. Strided convolution may be important for high resolution input images, especially for multi-camera systems or video data.

Figure 4B:
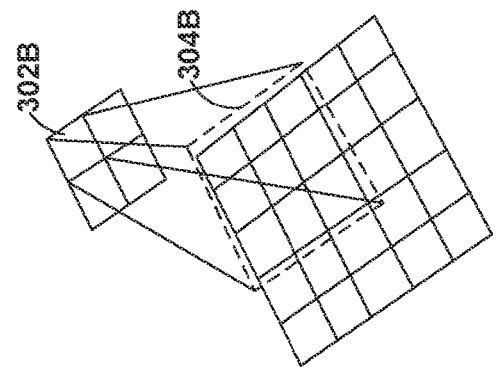
FIGS. 4A-4D are conceptual diagrams illustrating an example of strided convolution.
Figure 4D:
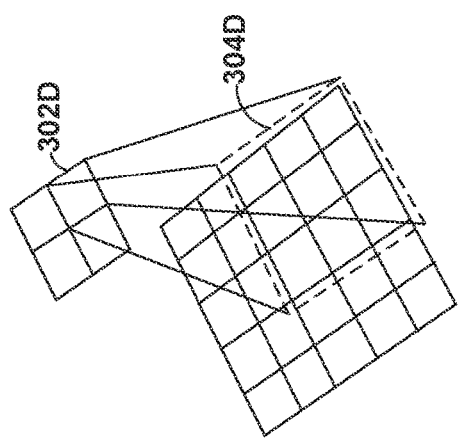
Figure 4A:
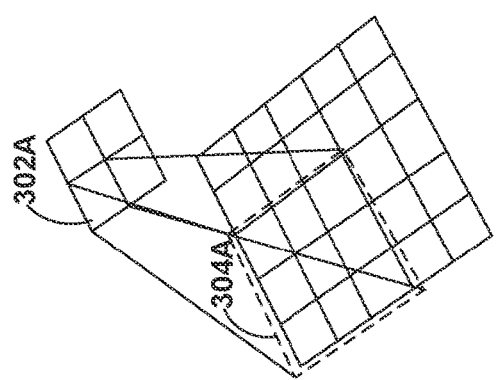
Figure 4C:
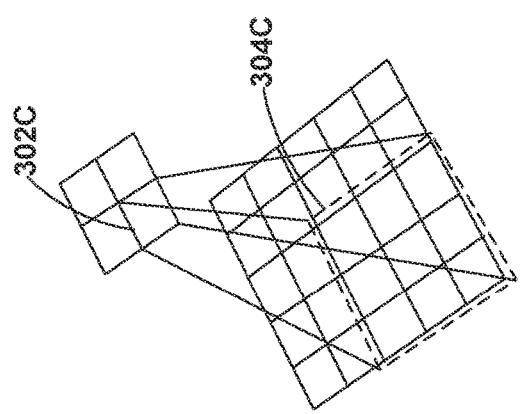

In the example of FIGS. 4A-4D, resolution reduction is performed to reduce respective 3×3 inputs to a single sample. In FIG. 4A, reduced resolution sample 302A is calculated from 3×3 samples 304A. In FIG. 4B, reduced resolution sample 302B is calculated from 3×3 samples 304B. In FIG. 4C, reduced resolution sample 302C is calculated from 3×3 samples 304C. In FIG. 4A, reduced resolution sample 302D is calculated from 3×3 samples 304D. As shown in these examples, 3×3 samples 304A overlap 3×3 samples 304B by a single column of samples. Similarly, 3×3 samples 304C overlap 3×3 samples 304D by a single column of samples. Likewise, 3×3 samples 304A overlap 3×3 samples 304C by a single row of samples. Similarly, 3×3 samples 304B overlap 3×3 samples 304D by a single row of samples. Thus, overall, a 5×5 set of input samples may be reduced to a 2×2 set of output samples. This may be achieved because the stride of this example is 2. That is, a starting edge of a set of 3×3 samples may be separated from a subsequent edge of a set of 3×3 samples by 2 samples, thereby leading to the overlap.

Figure 5:
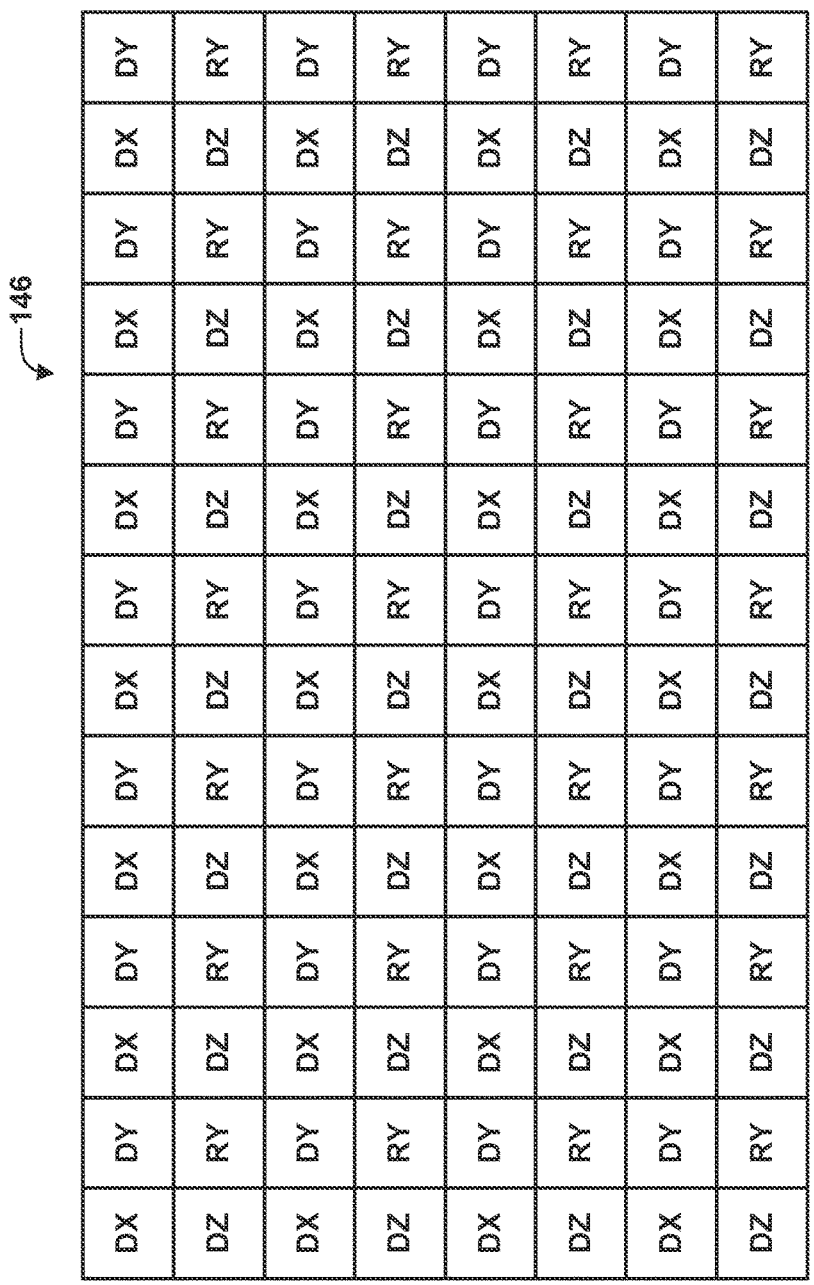
FIG. 5 is a conceptual diagram illustrating an example auxiliary input component that may be constructed according to techniques of this disclosure.

FIG. 5 is a conceptual diagram illustrating example auxiliary input component 148 that may be constructed according to techniques of this disclosure. In this example, odd-numbered rows of samples include alternating values DX and DY, which represent offsets between X and Y position values between consecutive images. Furthermore, in this example, even-numbered rows of samples include alternating values DZ and RY values, which represent offsets between Z position values and yaw rotation values between consecutive images.

That is, when two consecutive images are captured, a position of the vehicle including the camera and rotation of the vehicle including the camera may also be recorded for each of the images. Thus, for the later image, the differences between the positions and rotations may be used as auxiliary input data by the convolutional neural network. Because of the structure of auxiliary input component 148, each of the DX, DY, DZ, and RY values will be used for each 3×3 set of inputs during resolution reduction as shown in FIGS. 4A-4D above.

In this manner, overhead may be reduced by 4×, as compared with providing each of DX, DY, DZ, and RY as respective separate components, while allowing each convolution to have access to all of the auxiliary information. This same approach can be used with higher values of stride factors. The construction of the auxiliary input component may be independent of the size of the convolution kernel (e.g., 3×3, 5×5, 7×7, etc.)

Figures 6A, 6B:
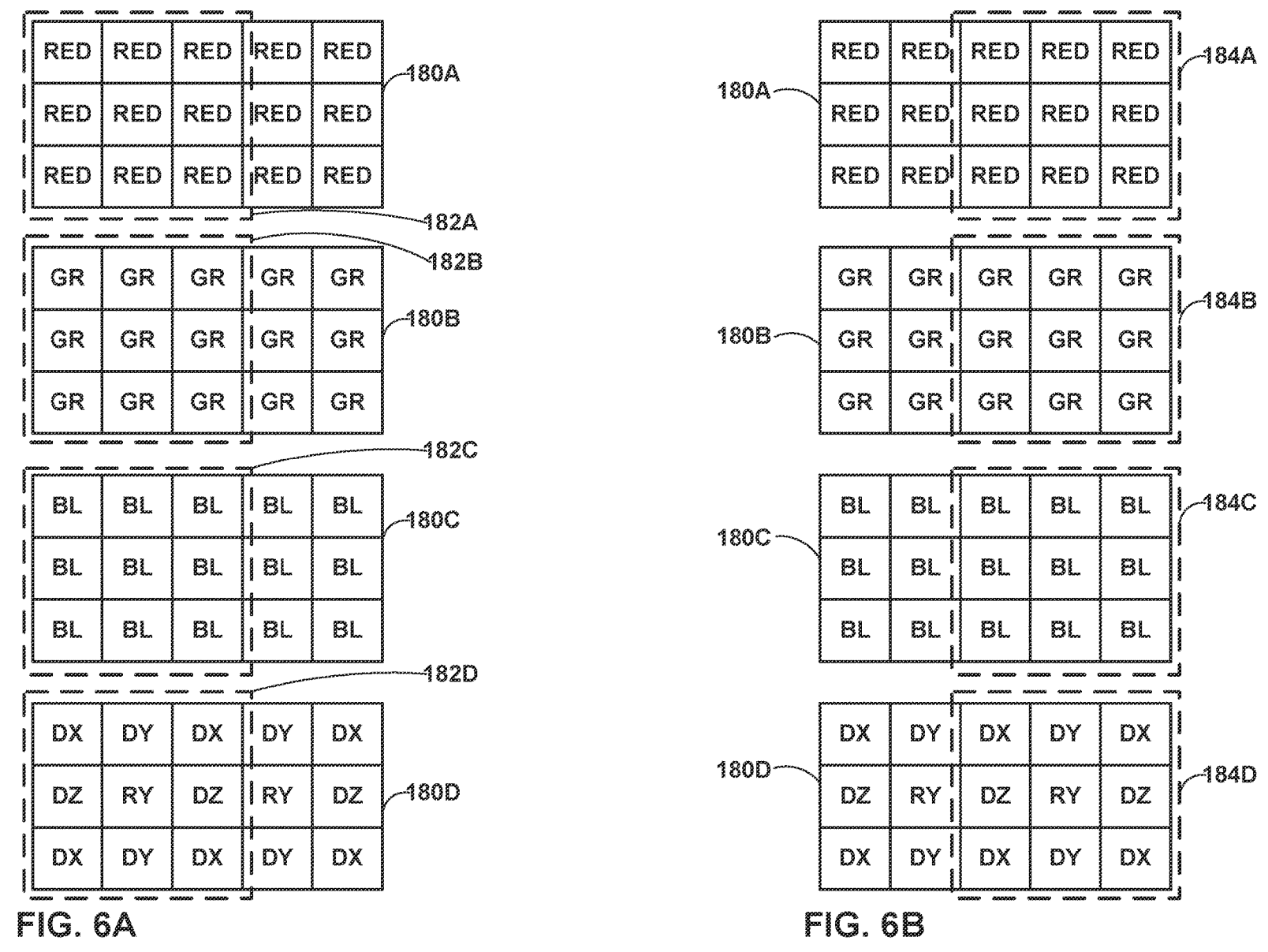

FIGS. 6A and 6B are conceptual diagrams illustrating sets of data from various components that are processed together during a common processing task. In the example of FIGS. 6A and 6B, it is assumed that a 3×3 convolution kernel size is used, and that a stride of 2 is used. As shown in FIG. 6A, initially, three image components (red component 180A, green component 180B, and blue component 180C) and one auxiliary component 180D are processed. In particular, red data 182A, green data 182B, blue data 182C, and auxiliary data 182D are processed together, i.e., at the same time.

Because the stride of 2 is used in this example, as shown in FIG. 6B, red data 184A, green data 184B, blue data 184C, and auxiliary data 184D are processed together in a subsequent processing step. As shown, auxiliary data 182D and auxiliary data 184D are equivalent. That is, both auxiliary data 182D and auxiliary data 184D have a DX value in upper-left, upper-right, lower-left, and lower-right corners, a DY value in the middle of the upper and lower rows, a DZ value in the middle of the left and right columns, and an RY value in the center. By constructing the auxiliary components according to the stride value used, for each processing step, the auxiliary input data will be the same, although the red, green, and blue sample values may differ. Thus, in this example, four auxiliary input values may be combined into a single component, thereby reducing the number of input components to be processed.

Figure 7:
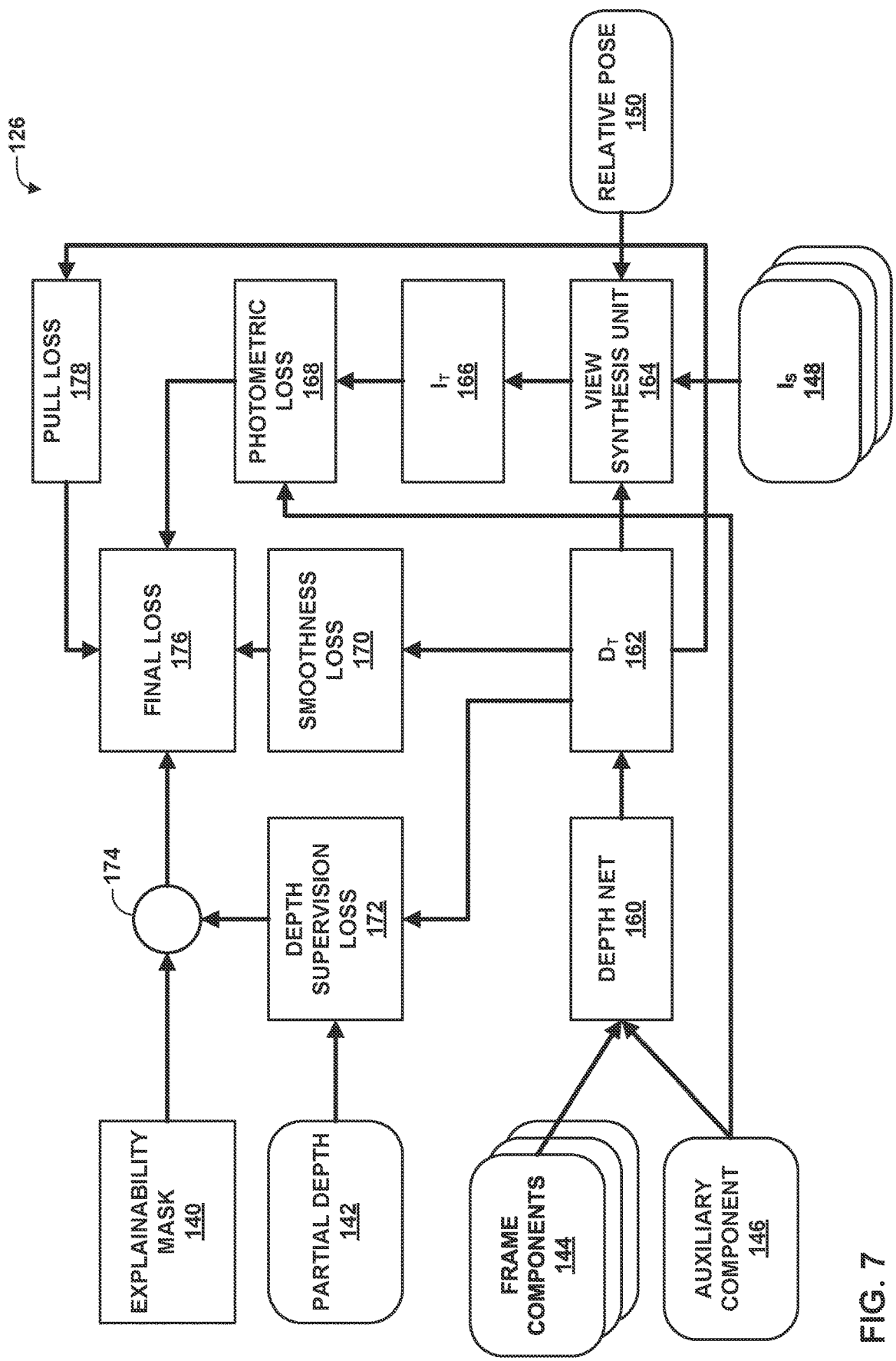
FIG. 7 is a block diagram illustrating an example set of components of a depth determination unit that determines depth for a single camera system.

FIG. 7 is a block diagram illustrating an example set of components of depth determination unit 126 of FIG. 2. Depth determination unit 126 includes depth net 160, $D_T$ 162, view synthesis unit 164, $I_T$ 166, photometric loss 168, smoothness loss 170, depth supervision loss 172, combination unit 174, final loss 176, and pull loss 178. As shown in the example of FIG. 7, depth determination unit 126 receives explainability mask 140, partial depth 142, frame components 144, auxiliary component 146, $I_S$ 148, and relative pose data 150.

Frame components 144 correspond to components (e.g., R, G, and B components or Y, U, and V/Y, Cb, and Cr components) of image frames, e.g., received from camera 110 of FIG. 1. Auxiliary component 146 correspond to an input component including values for two or more auxiliary input values (e.g., X, Y, Z position values and/or rotation values) corresponding to differences along or about X-, Y-, and/or Z-axes between odometry data for times at which the image frames were captured. Auxiliary component 146 may, for example, include each of X, Y, and Z position values and a yaw rotation value. In some examples, auxiliary component 146 may additionally or alternatively include other values, such as LiDAR or other range detection values, camera intrinsic data for a corresponding camera that captured an image represented by frame components 144, or the like. Depth net 160 represents a depth learning AI/ML unit, such as a neural network, trained to determine depth values for objects included in the image frames using the odometry data.

$D_T$ 162 represents a depth map at time T (corresponding to the time at which the later image was captured) as calculated by depth net 160.

View synthesis unit 164 may synthesize one or more additional views using original image frames ($I_S$ 148) and the depth map, i.e., $D_T$ 162, as well as relative pose data 150. That is, using the depth map and relative pose data 150, view synthesis unit 164 may warp samples of the original image frames to produce one or more warped image frames, such that the samples of the original image frames are moved horizontally according to the determined depth values for the object to which the samples correspond. Relative pose data 150 may be measured or estimated by a pose network. $I_T$ 166 represents the resulting warped image generated by view synthesis unit 164.

Photometric loss unit 168 may calculate photometric loss, representing photometric differences between pixels warped from the received image frames and the pixels in the warped image, i.e., $I_T$ 166. Photometric loss unit 168 may provide the photometric loss to final loss unit 176.

Smoothness loss unit 170 may calculate smoothness loss of the depth map, i.e., $D_T$ 162. Smoothness loss generally represents a degree to which depth values are smooth, e.g., represent geometrically natural depth. Smoothness loss unit 170 may provide the smoothness loss to final loss unit 176.

Depth supervision loss unit 172 may calculate depth supervision loss of the depth map, i.e., $D_T$ 162, using partial depth data 142.

Explainability mask 140 generally represents confidence values, i.e., values indicating how confident depth net 160 is for various regions/samples of calculated depth maps, such as $D_T$ 162. Thus, combination unit 174 may apply explainability mask 140 to the depth supervision loss calculated by depth supervision loss unit 172 and provide this masked input to final loss unit 176.

Pull loss unit 178 may calculate pull loss, representing a degree to which corners of an object are accurately joined in the depth map, i.e., $D_T$ 162. Pull loss unit 178 may receive data representing input shapes to calculate the pull loss. Pull loss unit 178 may provide the pull loss to final loss unit 176. The pull loss may act as a prior value for depth values to get the depth values to a predetermined set, which may help with areas for which data may not be readily understandable, such as open sky.

Ultimately, final loss unit 176 may calculate final loss, representing overall accuracy of the depth map, $D_T$ 162. The final loss may be minimized during an optimization process when training depth net 160. An optimizer for minimizing the final loss may be, for example, stochastic gradient descent, ADAM, NADAM, AdaGrad, or the like. During backpropagation of optimization, gradient values may flow backward through the final loss to other parts of the network.

Figure 8:
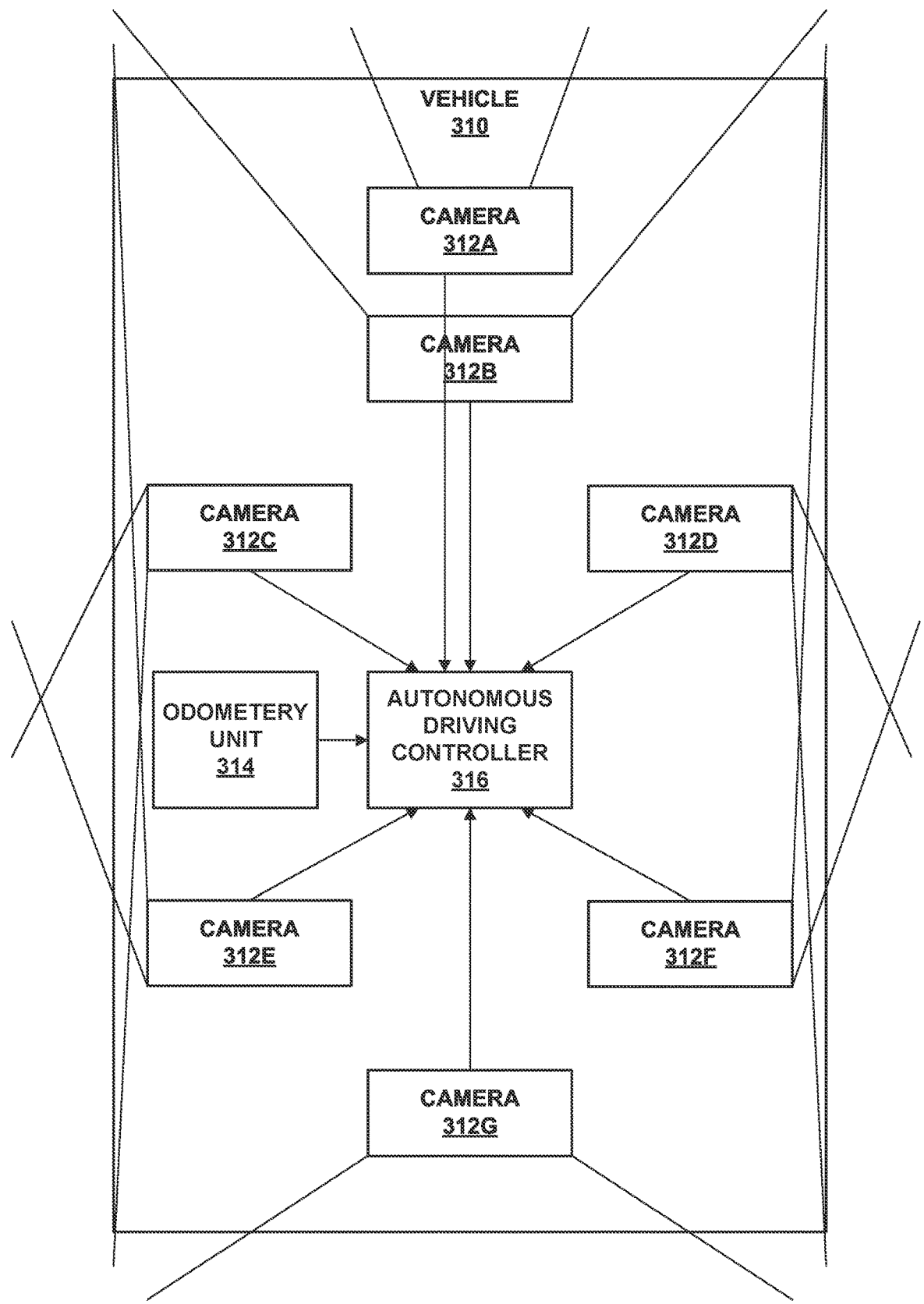
FIG. 8 is a block diagram illustrating an example vehicle with a multi-camera system and an autonomous driving controller according to techniques of this disclosure.

FIG. 8 is a block diagram illustrating an example vehicle 310 with a multi-camera system and autonomous driving controller 346 according to techniques of this disclosure. In particular, vehicle 310 includes cameras 312A-312G and odometry unit 314. In this example, cameras 312A and 312B are front-facing cameras with different focal lengths, cameras 312C and 312D are side-rear facing cameras, cameras 312E and 312F are side-front facing cameras, and camera 312G is a rear-facing camera. In this manner, imagery can be captured by the collection of cameras 312A-312G for a 360 degree view around vehicle 310.

Figure 9:
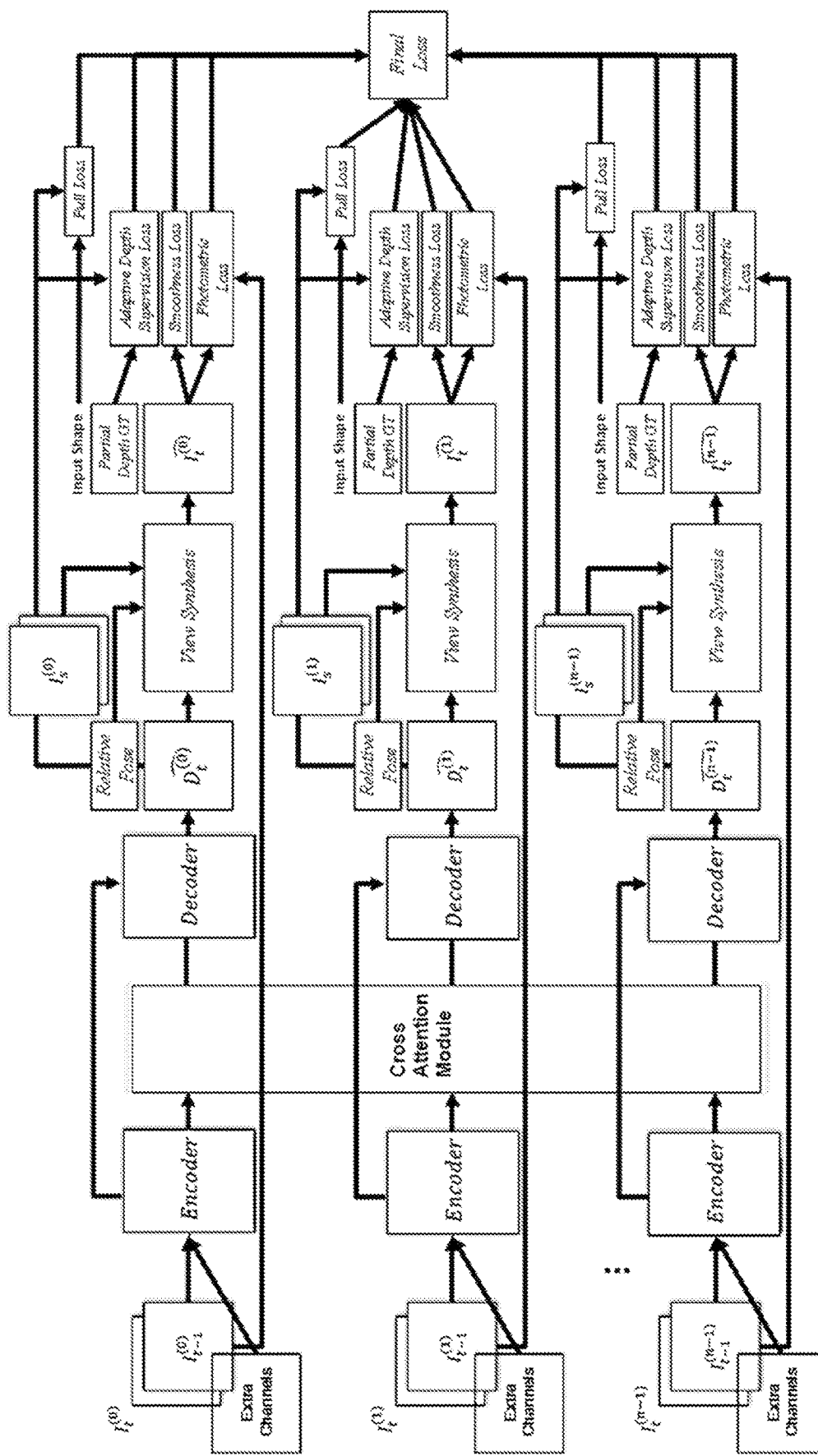
FIG. 9 is a block diagram illustrating an example set of components of a depth determination unit that determines depth for a multiple camera system.

Odometry unit 314 may provide odometry values for each image captured by cameras 312A-312G to autonomous driving controller 316. Autonomous driving controller 316 may include depth determination units for each of cameras 312A-312G, e.g., as shown in FIG. 9 below. While each view perspective may be captured by a single camera, in some cases, a single front-facing camera is not sufficient for a full scene understanding for autonomous driving control or ADAS performance. Multi-camera systems such as those shown in FIG. 8 may therefore be employed to capture the full surrounding environment of an ego vehicle, such as vehicle 310. The techniques of this disclosure may even more greatly improve the performance of depth estimation for multi-camera systems such as those shown in FIG. 8, for which multiple depth networks are employed to process respective imagery from various camera perspectives.

FIG. 9 is a block diagram illustrating an example set of components of a depth determination unit that determines depth for a multiple camera system. In this example, multiple depth networks 330A-330N (depth networks 330) may be used, one for each camera perspective of a multi-camera system, e.g., one for each of cameras 312A-312G of FIG. 8. Each depth network may include components similar to those of depth determination unit 126 of FIG. 7. In addition, a cross attention module may process encoded data received from various inputs (e.g., for various cameras), and a final loss unit may calculate a loss value for depth networks 330 collectively. Thus, according to the techniques of this disclosure, "extra channels" data as shown in FIG. 9 may represent one auxiliary input component including values for two or more auxiliary input values, e.g., position values, rotation values, camera intrinsic values, or the like.

Figure 10:
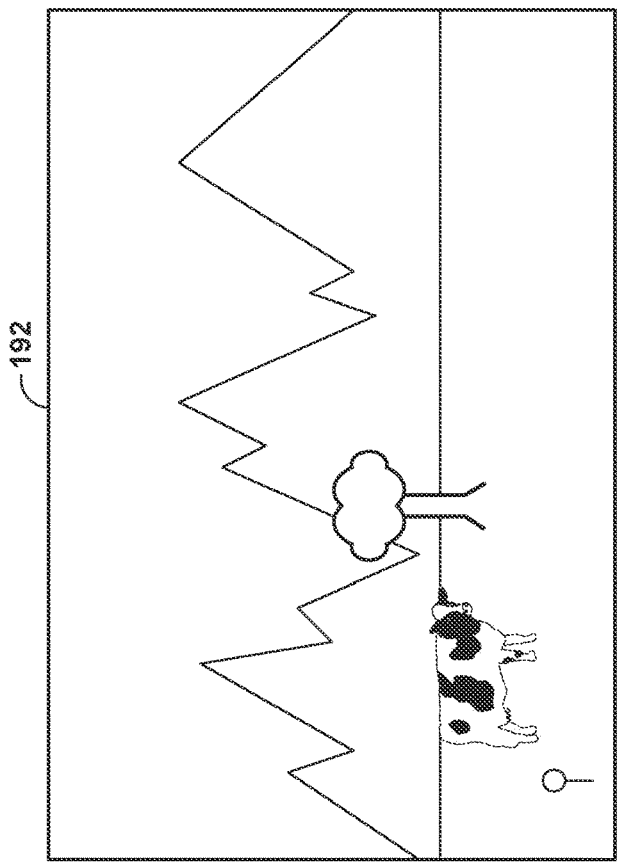
FIG. 10 is a conceptual diagram illustrating example images captured at different times to demonstrate motion parallax.
Figure 10:
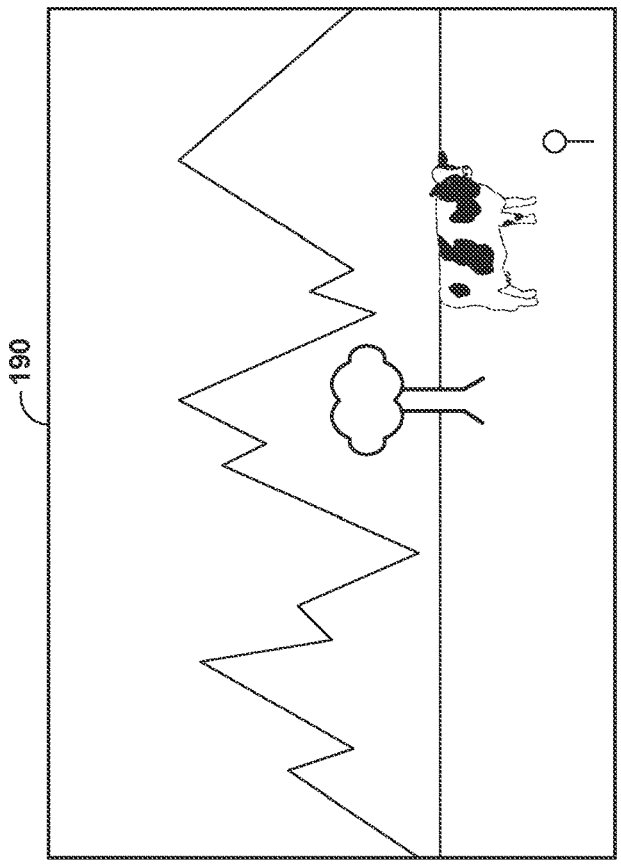

FIG. 10 is a conceptual diagram illustrating example images 190A, 190B captured at different times to demonstrate motion parallax. Motion parallax is generally the concept that objects moving at a constant speed across a frame of image data will appear to move a greater amount if they are closer to the camera than objects at further distances.

In the example of FIG. 10, it is assumed that image 190A is captured by a camera at a first time, and that image 190B is captured by the camera at a second, later time. The camera is assumed to be mounted in a vehicle that is traveling parallel with the mountains in the distance of images 190A, 190B. Thus, as can be seen in the example of FIG. 10, objects closer to the camera, such as the flower and cow, appear to move more than objects further from the camera, such as the tree, and the mountains in the far distance appear not to move at all between images 190A and 190B.

By taking advantage of odometry information, a neural network may take advantage of motion parallax. Research into the techniques of this disclosure demonstrated that lacking such odometry information results in suboptimal estimation of a depth map, especially in scenarios in which a vehicle pose is drastically/unpredictably changing between captured frames.

Heuristic testing of the techniques of this disclosure yielded experimental results as follows. Baseline depth estimation accuracy results were as follows for 4 odometry channels (DX, DY, DZ, and RY) for a 150 mm front facing camera:

| Abs_rel | MAE | RMSE | SQ_REL | RMSE_Log | A1 | A2 | A3 |
|---|---|---|---|---|---|---|---|
| 0.210 | 8.536 | 14.906 | 5.672 | 0.344 | 0.719 | 0.850 | 0.909 |

Baseline depth estimation accuracy results were as follows for 4 odometry channels (DX, DY, DZ, and RY) for a 50 mm front facing camera:

| Abs_rel | MAE | RMSE | SQ_REL | RMSE_Log | A1 | A2 | A3 |
|---|---|---|---|---|---|---|---|
| 0.120 | 5.737 | 11.127 | 2.293 | 0.224 | 0.851 | 0.935 | 0.967 |

Baseline depth estimation accuracy results were as follows for 4 odometry channels (DX, DY, DZ, and RY) for a side right rear facing camera:

| Abs_rel | MAE | RMSE | SQ_REL | RMSE_Log | A1 | A2 | A3 |
|---|---|---|---|---|---|---|---|
| 0.218 | 0.186 | 13.690 | 5.185 | 0.334 | 0.674 | 0.831 | 0.895 |

Baseline depth estimation accuracy results were as follows for 4 odometry channels (DX, DY, DZ, and RY) for a side left rear facing camera:

| Abs_rel | MAE | RMSE | SQ_REL | RMSE_Log | A1 | A2 | A3 |
|---|---|---|---|---|---|---|---|
| 0.186 | 8.645 | 15.630 | 5.418 | 0.366 | 0.764 | 0.859 | 0.911 |

Baseline depth estimation accuracy results were as follows for 4 odometry channels (DX, DY, DZ, and RY) for all cameras:

| Abs_rel | MAE | RMSE | SQ_REL | RMSE_Log | A1 | A2 | A3 |
|---|---|---|---|---|---|---|---|
| 0.184 | 7.890 | 13.838 | 4.642 | 0.317 | 0.752 | 0.869 | 0.920 |

Heuristic testing of the techniques of this disclosure yielded experimental results as follows. Baseline depth estimation accuracy results were as follows for 1 odometry channel for a 150 mm front facing camera:

| Abs_rel | MAE | RMSE | SQ_REL | RMSE_Log | A1 | A2 | A3 |
|---|---|---|---|---|---|---|---|
| 0.161 | 6.749 | 12.572 | 3.782 | 0.293 | 0.790 | 0.900 | 0.943 |

Baseline depth estimation accuracy results were as follows for 1 odometry channel for a 50 mm front facing camera:

| Abs_rel | MAE | RMSE | SQ_REL | RMSE_Log | A1 | A2 | A3 |
|---|---|---|---|---|---|---|---|
| 0.114 | 5.246 | 10.694 | 2.379 | 0.211 | 0.878 | 0.945 | 0.970 |

Baseline depth estimation accuracy results were as follows for 1 odometry channel for a side right rear facing camera:

| Abs_rel | MAE | RMSE | SQ_REL | RMSE_Log | A1 | A2 | A3 |
|---|---|---|---|---|---|---|---|
| 0.134 | 5.303 | 8.992 | 1.977 | 0.010 | 0.807 | 0.939 | 0.972 |

Baseline depth estimation accuracy results were as follows for 1 odometry channel for a side left rear facing camera:

| Abs_rel | MAE | RMSE | SQ_REL | RMSE_Log | A1 | A2 | A3 |
|---|---|---|---|---|---|---|---|
| 0.157 | 6.798 | 12.634 | 3.628 | 0.294 | 0.797 | 0.905 | 0.949 |

Baseline depth estimation accuracy results were as follows for 1 odometry channel for all cameras:

| Abs_rel | MAE | RMSE | SQ_REL | RMSE_Log | A1 | A2 | A3 |
|---|---|---|---|---|---|---|---|
| 0.142 | 6.042 | 11.223 | 2.941 | 0.252 | 0.818 | 0.922 | 0.958 |

In the tables above, "abs_rel" represents absolute relative error (lower is better), "MAE" represents mean absolute error (lower is better), "RMSE" represents root mean squared error (lower is better), "SQ_REL" represents squared relative error (lower is better), RMSE_log represents a logarithmic value of RMSE (lower is better), and A1-A3 represent fitness values (closer to 1 is better).

Figure 11:
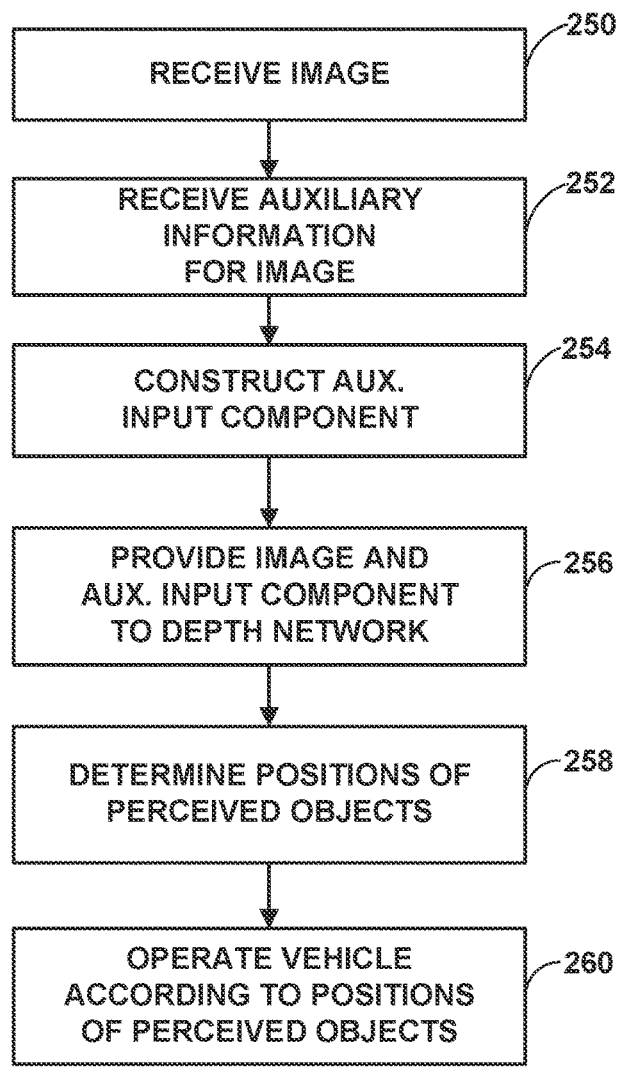
FIG. 11 is a flowchart illustrating an example method of determining depth for images in objects using odometry data according to techniques of this disclosure.

FIG. 11 is a flowchart illustrating an example method of determining depth for images in objects using odometry data according to techniques of this disclosure. The method of FIG. 11 is described with respect to autonomous driving controller 120 of FIGS. 1 and 2 for purposes of explanation. Autonomous driving controller 316 of FIG. 8 may perform a similar method, albeit for multiple cameras and multiple auxiliary input components.

Initially, autonomous driving controller 120 receives a captured image (250), e.g., from camera 110. Autonomous driving controller 120 also receives auxiliary information for the image (252), e.g., odometry data from odometry unit 112. That is, autonomous driving controller 120 may receive odometry information indicating a position/orientation of vehicle 100 at the time the image was captured. Additionally or alternatively, the auxiliary information may include camera intrinsic data, LiDAR data, or the like.

Autonomous driving controller 120 may then construct an auxiliary input component (254). For example, autonomous driving controller 120 may calculate differences between the odometry values for the image and odometry values for a previous image, e.g., a DX value (representing a difference along the X-dimension), a DY value (representing a difference along the Y-dimension), a DZ value (representing a difference along the Z-dimension), and an RY value (representing rotation about the Y-dimension). Autonomous driving controller 120 may then form the auxiliary input component to include the DX, DY, DZ, and RY component in a repeating block pattern, e.g., as shown in and discussed with respect to FIG. 5 above.

Autonomous driving controller 120 may then provide the image and the auxiliary input component to a depth network (256). The depth network may process the image and the auxiliary input component to determine positions of perceived objects (258) in the image, e.g., other cars, trees, signs, barriers, or other such objects. Autonomous driving controller 120 may then operate the vehicle according to positions of the perceived objects (260). For example, if there are no perceived objects in front of vehicle 100, autonomous driving controller 120 may maintain a current speed and heading. As another example if there is an approaching object, such as another vehicle, in front of vehicle 100, autonomous driving controller 120 may brake and/or turn vehicle 100.

In this manner, the method of FIG. 11 represents an example of a method of processing image data including obtaining an image to be processed; obtaining a first auxiliary value for the image and a second auxiliary value for the image; generating an input component including the first auxiliary value and the second auxiliary value arranged in a pattern according to a stride of a neural network; and providing the image and the input component to the neural network.

Various examples of the techniques of this disclosure are summarized in the following clauses:

Clause 1: A method of processing image data, the method comprising: obtaining an image to be processed; obtaining a first auxiliary value for the image and a second auxiliary value for the image; generating an input component including the first auxiliary value and the second auxiliary value arranged in a pattern according to a stride of a neural network; and providing the image and the input component to the neural network.

Clause 2: The method of clause 1, wherein the image includes a first color component, a second color component, and a third color component, and wherein providing the image comprises providing the first color component, the second color component, and the third color component to the neural network.

Clause 3: The method of any of clauses 1 and 2, wherein the first color component comprises a red component, the second color component comprises a green component, and the third color component comprises a blue component.

Clause 4: The method of any of clauses 1 and 2, wherein the first color component comprises a luminance component, the second color component comprises a blue hue chrominance component, and the third color component comprises a red hue chrominance component.

Clause 5: The method of any of clauses 1-4, wherein the stride of the neural network represents a number of values of the image and the input component that the neural network processes per processing step.

Clause 6: The method of any of clauses 1-5, wherein the stride of the neural network is 2, and wherein generating the input component comprises generating the input component such that each sub-component of the input component, where the sub-components include at least 2 values, includes the first auxiliary value and the second auxiliary value.

Clause 7: The method of any of clauses 1-6, further comprising obtaining a third auxiliary value for the image and a fourth auxiliary value for the image, wherein generating the input component comprises generating the input component to include the third auxiliary value and the fourth auxiliary value.

Clause 8: The method of clause 7, wherein generating the input component comprises: generating each even-numbered row of the input component to include a repeating pattern of the first auxiliary value followed by the second auxiliary value; and generating each odd-numbered row of the input component to include a repeating pattern of the third auxiliary value followed by the fourth auxiliary value.

Clause 9: The method of any of clauses 7 and 8, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

Clause 10: The method of any of clauses 1-9, wherein the image has a number of samples, and wherein the input component has a number of samples equal to the number of samples of the image.

Clause 11: The method of any of clauses 1-10, wherein the image is obtained from a camera of a vehicle, the method further comprising: receiving, from the neural network, data representing positions of objects relative to a position of the vehicle; and at least partially autonomously controlling the vehicle according to the positions of the objects.

Clause 12: The method of clause 1, wherein the image includes a first color component, a second color component, and a third color component, and wherein providing the image comprises providing the first color component, the second color component, and the third color component to the neural network.

Clause 13: The method of clause 1, wherein the first color component comprises a red component, the second color component comprises a green component, and the third color component comprises a blue component.

Clause 14: The method of clause 1, wherein the first color component comprises a luminance component, the second color component comprises a blue hue chrominance component, and the third color component comprises a red hue chrominance component.

Clause 15: The method of clause 1, wherein the stride of the neural network represents a number of values of the image and the input component that the neural network processes per processing step.

Clause 16: The method of clause 1, wherein the stride of the neural network is 2, and wherein generating the input component comprises generating the input component such that each sub-component of the input component, where the sub-components include at least 2 values, includes the first auxiliary value and the second auxiliary value.

Clause 17: The method of clause 1, further comprising obtaining a third auxiliary value for the image and a fourth auxiliary value for the image, wherein generating the input component comprises generating the input component to include the third auxiliary value and the fourth auxiliary value.

Clause 18: The method of clause 17, wherein generating the input component comprises: generating each even-numbered row of the input component to include a repeating pattern of the first auxiliary value followed by the second auxiliary value; and generating each odd-numbered row of the input component to include a repeating pattern of the third auxiliary value followed by the fourth auxiliary value.

Clause 19: The method of clause 17, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

Clause 20: The method of clause 1, wherein the image has a number of samples, and wherein the input component has a number of samples equal to the number of samples of the image.

Clause 21: The method of clause 1, wherein the image is obtained from a camera of a vehicle, the method further comprising: receiving, from the neural network, data representing positions of objects relative to a position of the vehicle; and at least partially autonomously controlling the vehicle according to the positions of the objects.

Clause 22: A device for processing image data, the device comprising one or more means for performing the method of any of clauses 1-21.

Clause 23: The device of clause 22, wherein the one or more means comprise one or more processors implemented in circuitry.

Clause 24: The device of any of clauses 22 and 23, wherein the one or more means comprise a memory configured to store image data.

Clause 25: A device for processing image data, the device comprising: means for obtaining an image to be processed; means for obtaining a first auxiliary value for the image and a second auxiliary value for the image; means for generating an input component including the first auxiliary value and the second auxiliary value arranged in a pattern according to a stride of a neural network; and means for providing the image and the input component to the neural network.

Clause 26: A method of processing image data, the method comprising: obtaining an image to be processed; obtaining a first auxiliary value for the image and a second auxiliary value for the image; generating an input component including the first auxiliary value and the second auxiliary value arranged in a pattern according to a stride of a neural network; and providing the image and the input component to the neural network.

Clause 27: The method of clause 26, wherein the image includes a first color component, a second color component, and a third color component, and wherein providing the image comprises providing the first color component, the second color component, and the third color component to the neural network.

Clause 28: The method of clause 26, wherein the first color component comprises a red component, the second color component comprises a green component, and the third color component comprises a blue component.

Clause 29: The method of clause 26, wherein the first color component comprises a luminance component, the second color component comprises a blue hue chrominance component, and the third color component comprises a red hue chrominance component.

Clause 30: The method of clause 26, wherein the stride of the neural network represents a number of values of the image and the input component that the neural network processes per processing step.

Clause 31: The method of clause 26, wherein the stride of the neural network is 2, and wherein generating the input component comprises generating the input component such that each sub-component of the input component, where the sub-components include at least 2 values, includes the first auxiliary value and the second auxiliary value.

Clause 32: The method of clause 26, further comprising obtaining a third auxiliary value for the image and a fourth auxiliary value for the image, wherein generating the input component comprises generating the input component to include the third auxiliary value and the fourth auxiliary value.

Clause 33: The method of clause 32, wherein generating the input component comprises: generating each even-numbered row of the input component to include a repeating pattern of the first auxiliary value followed by the second auxiliary value; and generating each odd-numbered row of the input component to include a repeating pattern of the third auxiliary value followed by the fourth auxiliary value.

Clause 34: The method of clause 32, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

Clause 35: The method of clause 26, wherein the image has a number of samples, and wherein the input component has a number of samples equal to the number of samples of the image.

Clause 36: The method of clause 26, wherein the image is obtained from a camera of a vehicle, the method further comprising: receiving, from the neural network, data representing positions of objects relative to a position of the vehicle; and at least partially autonomously controlling the vehicle according to the positions of the objects.

Clause 37: A device for processing image data, the device comprising: a memory configured to store image data; and a processing system comprising one or more processors implemented in circuitry, the processing system being configured to: obtain an image to be processed; obtain a first auxiliary value for the image and a second auxiliary value for the image; generate an input component including the first auxiliary value and the second auxiliary value arranged in a pattern according to a stride of a neural network; and provide the image and the input component to the neural network.

Clause 38: The device of clause 37, wherein the image includes a first color component, a second color component, and a third color component, and wherein providing the image comprises providing the first color component, the second color component, and the third color component to the neural network.

Clause 39: The device of clause 37, wherein the first color component comprises a red component, the second color component comprises a green component, and the third color component comprises a blue component.

Clause 40: The device of clause 37, wherein the first color component comprises a luminance component, the second color component comprises a blue hue chrominance component, and the third color component comprises a red hue chrominance component.

Clause 41: The device of clause 37, wherein the stride of the neural network represents a number of values of the image and the input component that the neural network processes per processing step.

Clause 42: The device of clause 37, wherein the stride of the neural network is 2, and wherein generating the input component comprises generating the input component such that each sub-component of the input component, where the sub-components include at least 2 values, includes the first auxiliary value and the second auxiliary value.

Clause 43: The device of clause 37, wherein the processing system is further configured to obtain a third auxiliary value for the image and a fourth auxiliary value for the image, wherein to generate the input component, the processing system is configured to generate the input component to include the third auxiliary value and the fourth auxiliary value.

Clause 44: The device of clause 43, wherein to generate the input component, the processing system is configured to: generate each even-numbered row of the input component to include a repeating pattern of the first auxiliary value followed by the second auxiliary value; and generate each odd-numbered row of the input component to include a repeating pattern of the third auxiliary value followed by the fourth auxiliary value.

Clause 45: The device of clause 43, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

Clause 46: The device of clause 37, wherein the image has a number of samples, and wherein the input component has a number of samples equal to the number of samples of the image.

Clause 47: The device of clause 37, wherein the image is obtained from a camera of a vehicle, and wherein the processing system is further configured to: receive, from the neural network, data representing positions of objects relative to a position of the vehicle; and at least partially autonomously control the vehicle according to the positions of the objects.

Clause 48: A device for processing image data, the device comprising: means for obtaining an image to be processed; means for obtaining a first auxiliary value for the image and a second auxiliary value for the image; means for generating an input component including the first auxiliary value and the second auxiliary value arranged in a pattern according to a stride of a neural network; and means for providing the image and the input component to the neural network.

Clause 49: The device of clause 48, wherein the image includes a first color component, a second color component, and a third color component, and wherein the means for providing the image comprises means for providing the first color component, the second color component, and the third color component to the neural network.

Clause 50: The device of clause 48, wherein the first color component comprises a red component, the second color component comprises a green component, and the third color component comprises a blue component.

Clause 51: The device of clause 48, wherein the first color component comprises a luminance component, the second color component comprises a blue hue chrominance component, and the third color component comprises a red hue chrominance component.

Clause 52: The device of clause 48, wherein the stride of the neural network represents a number of values of the image and the input component that the neural network processes per processing step.

Clause 53: The device of clause 48, wherein the stride of the neural network is 2, and wherein the means for generating the input component comprises means for generating the input component such that each sub-component of the input component, where the sub-components include at least 2 values, includes the first auxiliary value and the second auxiliary value.

Clause 54: The device of clause 48, further comprising means for obtaining a third auxiliary value for the image and a fourth auxiliary value for the image, wherein the means for generating the input component comprises means for generating the input component to include the third auxiliary value and the fourth auxiliary value.

Clause 55: The device of clause 54, wherein the means for generating the input component comprises: means for generating each even-numbered row of the input component to include a repeating pattern of the first auxiliary value followed by the second auxiliary value; and means for generating each odd-numbered row of the input component to include a repeating pattern of the third auxiliary value followed by the fourth auxiliary value.

Clause 56: The device of clause 54, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

Clause 57: The device of clause 48, wherein the image has a number of samples, and wherein the input component has a number of samples equal to the number of samples of the image.

Clause 58: The device of clause 48, wherein the image is obtained from a camera of a vehicle, further comprising: means for receiving, from the neural network, data representing positions of objects relative to a position of the vehicle; and means for at least partially autonomously controlling the vehicle according to the positions of the objects.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing image data, the method comprising:
   obtaining an image to be processed;
   obtaining a first auxiliary value for the image and a second auxiliary value for the image;
   generating an input component including the first auxiliary value and the second auxiliary value arranged in a pattern according to a stride of a neural network; and
   providing the image and the input component to the neural network.

2. The method of claim 1, wherein the image includes a first color component, a second color component, and a third color component, and wherein providing the image comprises providing the first color component, the second color component, and the third color component to the neural network.

3. The method of claim 2, wherein the first color component comprises a red component, the second color component comprises a green component, and the third color component comprises a blue component.

4. The method of claim 2, wherein the first color component comprises a luminance component, the second color component comprises a blue hue chrominance component, and the third color component comprises a red hue chrominance component.

5. The method of claim 1, wherein the stride of the neural network represents a number of values of the image and the input component that the neural network processes per processing step.

6. The method of claim 1, wherein the stride of the neural network is 2, and wherein generating the input component comprises generating the input component such that each sub-component of the input component, where the sub-components include at least 2 values, includes the first auxiliary value and the second auxiliary value.

7. The method of claim 1, further comprising obtaining a third auxiliary value for the image and a fourth auxiliary value for the image, wherein generating the input component comprises generating the input component to include the third auxiliary value and the fourth auxiliary value.

8. The method of claim 7, wherein generating the input component comprises:
   generating each even-numbered row of the input component to include a repeating pattern of the first auxiliary value followed by the second auxiliary value; and
   generating each odd-numbered row of the input component to include a repeating pattern of the third auxiliary value followed by the fourth auxiliary value.

9. The method of claim 7, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

10. The method of claim 1, wherein the image has a number of samples, and wherein the input component has a number of samples equal to the number of samples of the image.

11. The method of claim 1, wherein the image is obtained from a camera of a vehicle, the method further comprising:
   receiving, from the neural network, data representing positions of objects relative to a position of the vehicle; and
   at least partially autonomously controlling the vehicle according to the positions of the objects.

12. A device for processing image data, the device comprising:
   a memory configured to store image data; and
   a processing system comprising one or more processors implemented in circuitry, the processing system being configured to:
   obtain an image to be processed;
   obtain a first auxiliary value for the image and a second auxiliary value for the image;
   generate an input component including the first auxiliary value and the second auxiliary value arranged in a pattern according to a stride of a neural network; and
   provide the image and the input component to the neural network.

13. The device of claim 12, wherein the image includes a first color component, a second color component, and a third color component, and wherein providing the image comprises providing the first color component, the second color component, and the third color component to the neural network.

14. The device of claim 13, wherein the first color component comprises a red component, the second color component comprises a green component, and the third color component comprises a blue component.

15. The device of claim 13, wherein the first color component comprises a luminance component, the second color component comprises a blue hue chrominance component, and the third color component comprises a red hue chrominance component.

16. The device of claim 12, wherein the stride of the neural network represents a number of values of the image and the input component that the neural network processes per processing step.

17. The device of claim 12, wherein the stride of the neural network is 2, and wherein generating the input component comprises generating the input component such that each sub-component of the input component, where the sub-components include at least 2 values, includes the first auxiliary value and the second auxiliary value.

18. The device of claim 12, wherein the processing system is further configured to obtain a third auxiliary value for the image and a fourth auxiliary value for the image, wherein to generate the input component, the processing system is configured to generate the input component to include the third auxiliary value and the fourth auxiliary value.

19. The device of claim 18, wherein to generate the input component, the processing system is configured to:
generate each even-numbered row of the input component to include a repeating pattern of the first auxiliary value followed by the second auxiliary value; and
generate each odd-numbered row of the input component to include a repeating pattern of the third auxiliary value followed by the fourth auxiliary value.

20. The device of claim 18, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

21. The device of claim 12, wherein the image has a number of samples, and wherein the input component has a number of samples equal to the number of samples of the image.

22. The device of claim 12, wherein the image is obtained from a camera of a vehicle, and wherein the processing system is further configured to:
receive, from the neural network, data representing positions of objects relative to a position of the vehicle; and
at least partially autonomously control the vehicle according to the positions of the objects.

23. A device for processing image data, the device comprising:
means for obtaining an image to be processed;
means for obtaining a first auxiliary value for the image and a second auxiliary value for the image;
means for generating an input component including the first auxiliary value and the second auxiliary value arranged in a pattern according to a stride of a neural network; and
means for providing the image and the input component to the neural network.

24. The device of claim 23, wherein the image includes a first color component, a second color component, and a third color component, and wherein the means for providing the image comprises means for providing the first color component, the second color component, and the third color component to the neural network.

25. The device of claim 24, wherein the first color component comprises a red component, the second color component comprises a green component, and the third color component comprises a blue component.

26. The device of claim 24, wherein the first color component comprises a luminance component, the second color component comprises a blue hue chrominance component, and the third color component comprises a red hue chrominance component.

27. The device of claim 23, wherein the stride of the neural network represents a number of values of the image and the input component that the neural network processes per processing step.

28. The device of claim 23, wherein the stride of the neural network is 2, and wherein the means for generating the input component comprises means for generating the input component such that each sub-component of the input component, where the sub-components include at least 2 values, includes the first auxiliary value and the second auxiliary value.

29. The device of claim 23, further comprising means for obtaining a third auxiliary value for the image and a fourth auxiliary value for the image, wherein the means for generating the input component comprises means for generating the input component to include the third auxiliary value and the fourth auxiliary value.

30. The device of claim 29, wherein the means for generating the input component comprises:
means for generating each even-numbered row of the input component to include a repeating pattern of the first auxiliary value followed by the second auxiliary value; and
means for generating each odd-numbered row of the input component to include a repeating pattern of the third auxiliary value followed by the fourth auxiliary value.

31. The device of claim 29, wherein the image was captured by a camera at a location at a time, the location having an X-component value, a Y-component value, and a Z-component value, wherein the camera had a yaw rotation value at the time, and wherein the first auxiliary value represents the X-component value, the second auxiliary value represents the Y-component value, the third auxiliary value represents the Z-component value, and the fourth auxiliary value represents the yaw rotation value.

32. The device of claim 23, wherein the image has a number of samples, and wherein the input component has a number of samples equal to the number of samples of the image.

33. The device of claim 23, wherein the image is obtained from a camera of a vehicle, further comprising:
means for receiving, from the neural network, data representing positions of objects relative to a position of the vehicle; and
means for at least partially autonomously controlling the vehicle according to the positions of the objects.

* * * * *